April 23, 1968   G. A. CARLBERG ET AL   3,379,228
PORTABLE SAW TABLE

Filed Nov. 9, 1965   2 Sheets-Sheet 1

INVENTORS,
George A. Carlberg,
Burton L. Siegal

By Norton Lesser.
Attorney

United States Patent Office 3,379,228
Patented Apr. 23, 1968

3,379,228
PORTABLE SAW TABLE
George A. Carlberg, Northbrook, and Burton L. Siegal, Skokie, Ill., assignors, by direct and mesne assignments, to Porta-Table Corporation, Chicago, Ill., a corporation of Illinois
Filed Nov. 9, 1965, Ser. No. 506,963
11 Claims. (Cl. 143—132)

ABSTRACT OF THE DISCLOSURE

A work table for supporting a power saw in position for the controlled cutting of construction material; said table being constructed of a planar top section having supporting means for said portable saw mounted to the upper portion thereof to permit movement of the saw across the width of said table. The planar top section of said table adapted to be recessed across its width in the general area of said supporting means to in effect define separated portions of said top section. A plurality of spaced apart reinforcing ribs depending from the underside of the top section and spanning said recess to effectively interconnect said separated portions of said top section. In addition, a plurality of retractable pin members upstanding from the working surface of the top section and positioned such that they are adapted to be engaged by a section of construction material to support said section at a predetermined angle relative the path of travel of the power saw as defined by the aforementioned supporting means.

---

This invention relates in general to tables for portable power equipment and more particularly to a portable table for use on construction sites to enable portable saws to be utilized more efficiently.

Briefly, the present invention is designed to facilitate more accurate and economical use of portable saws or the like in cutting lumber, siding and similar materials at construction sites.

Carpenters, for example, measure studding as necessary at the site and mark the desired length on the stud. A portable saw is then manually manipulated to cut the stud. As accurate guiding is not provided for the heavy saw and the work is often loosely held, the cut can be uneven, inaccurate and/or ragged. On the other hand, the use of a conventional table saw presents a number of difficulties due to the weight and the inconvenience of moving and locating the conventional table saw, especially if the most convenient location is on scaffolding or requires frequent changing.

The herein invention is directed to solving the aforesaid problems by providing the carpenter with a sturdy, lightweight, relatively long work table that can be transported conveniently from job site to job site. The table is further provided with adjustable supporting means designed to accommodate various types of portable saws, thus adding the feature of versatility to that of portability.

It is therefore one object of the present invention to provide a portable table and/or means for using the same to facilitate the use of portable saws in cutting construction material such as lumber or siding.

It is another object of the present invention to enable more accurate and economical cutting of lumber, siding or similar materials at construction sites.

Other objects and features of this invention will become apparent on examination of the following specification, claims and drawings; wherein:

Figures 1, 2:
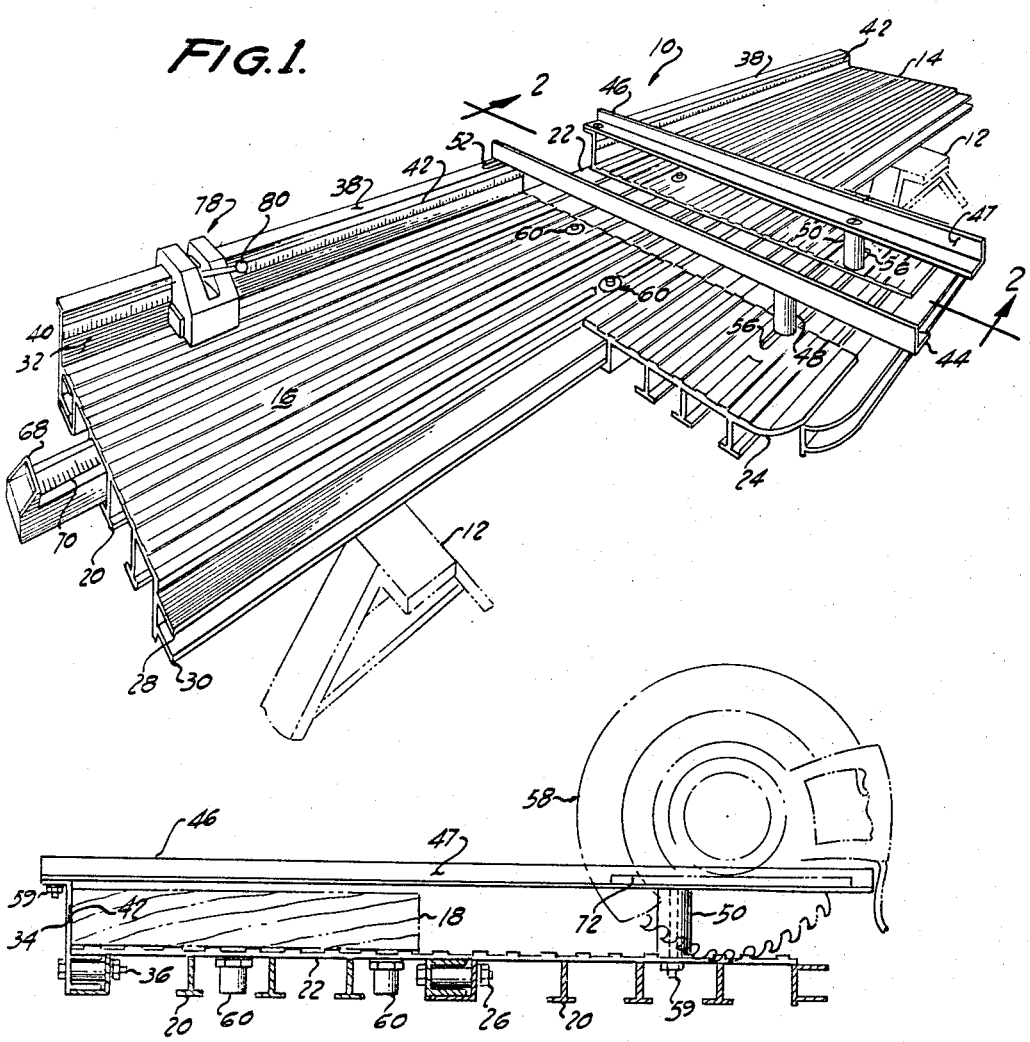
FIG. 1 is a perspective view of a table incorporating the principles of the present invention.
FIG. 2 is a sectional view taken generally along the line 2—2 in FIG. 1 and illustrating a portable saw in position on the table; and, FIG. 3 is a fragmentary perspective view of the table and a saw thereon shown in broken lines for cutting a stud.

In FIG. 1 of the drawings, a portable table is indicated by the reference character 10. The table 10 is shown mounted under the force of gravity on a pair of horses 12 illustrated in broken outline. Any convenient support structure at a construction site may, of course, be used in place of the horses.

Figure 3:
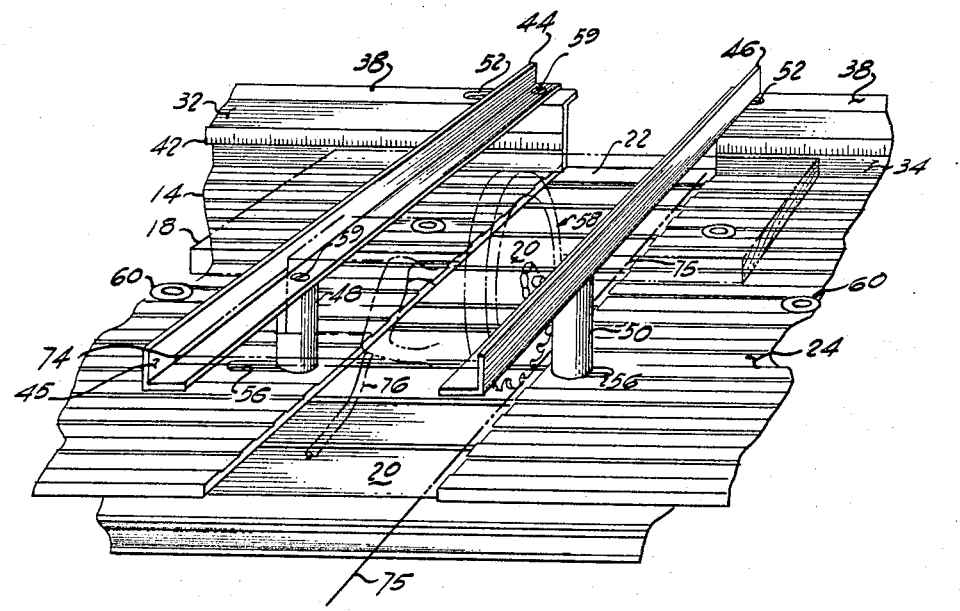

Table 10 is approximately 108" in overall length and 19½" wide. The table is formed from an elongated relatively thin top section 14 which has a planar top surface 16 for supporting the construction material to be worked upon. The table is further provided with reinforcing means 20 which depend from the underside thereof and extend for a portion of the length of the table. A top planar surface 16 is formed on table 10 for supporting a piece of lumber such as studding 18, as indicated by broken lines in FIGS. 2 and 3 or a piece of aluminum siding. The reinforcing means comprises a plurality of depending extruded T-shaped ribs 20 which are formed integrally with and beneath top section 14. Fine ribs are provided along the top surface 16 to improve the sliding action of the piece to be cut. The top planar surface 16 of the section 14 has a recess or cutout portion 22 of approximately 3" width intermediate the ends of the table with one edge of the recess located approximately 24" from the right end of the section 14. The ribs 20 extend across the opening or cutout 22 and serve to hold the portions of the wall on opposite sides of the cutout together and rigidify the table. The ribs 20 further provide convenient structure for fastening apparatus to the table, such as the extension 24 and the guide fences 32 and 34. The bottom surface of the ribs 20 provide a planar surface upon which the table 10 is conveniently supported in a horizontal position. The edges of the section 14 formed by the cutout or recessed portion 22 cooperate with the reinforcing ribs 20 to define a space for the reception of the saw blade during cutting. Another feature of this construction is that since the recess or cutout 22 extends completely through the top section 14, there are provided openings whereby the chaff from the sawing operation may be eliminated from the working area.

An extension or apron 24 of similar construction to top section 14, but shorter than top section 14, is attached to one edge of top section 14. Apron 24 is attached to top section 14 intermediate the ends of the top section 14 by conventional bolts and nuts 26, received between a pair of extruded horizontal edge rails 28 and 30 on top section 14. The top edge rail 28 is slightly recessed below surface 16 to permit overlapping engagement between the top wall of apron 24 and the top edge rail 28 so that the top surface of apron 24 is flush with surface 16. A cutout portion in the apron similar to portion 22 is aligned with cutout portion 22. The primary advantage of using the extension 24 is that it permits a wider board to be worked on without widening the table along its entire length.

A pair of spaced L-shaped guide rails 44 and 46 having vertical legs 47 are carried by the table 10 above and parallel to the planar surface 16 adjacent opposite edges of the cutout portion 22. One end of each guide rail is supported on a respective horizontal leg 38 of fences 32 and 34. The other end of each rail is suported on a respective standard 48 and 50. The standards 48 and 50 may be supported on apron 24. Slots 52 in the respective legs 38 and respective slots 56 on the apron permit the rails 44 and 46 to be adjusted relative to each other along the elongate axis of the table for accommodating the sole plate 72 of a portable power saw 58 such as indicated in broken outline in FIGS. 2 and 3. Flathead screws 59, which do not project above the surface of the rails 44 and 46 serve to fasten the rails in position.

A pair of retractable pins 60 projecting above surface 16 in their non-retracted position are provided on opposite sides of cutout portion 22. Each pair of pins describes a line diverging at a 45° angle with respect to the line described by the blade 62 of saw 58 as it passes over cutout portion 22 to enable a miter cut of the stud as described in the aforementioned application. The stud may be pressed laterally against the side of the extended guide pins causing the stud to be axially positioned 45° from the blade path for proper mitering. The pins 60 may be retracted when a stud is to be cut perpendicularly.

An adjustable stop 68 which carries an extension scale 70 and slides between the T-shaped ribs 20 may be used to support long lengths of lumber or siding and as a stop for cutting a number of pieces to a desired length without repeated measurement.

To use the saw 58 on the table 10, the guide rails 44 and 46 are adjusted to receive the sides of the saw sole plate 72 and 74. Rail 46 is adjusted to receive the right hand edge of the plate 72 with the saw blade 62 located on a line 75 in alignment with the theoretical zero mark of the tapes 42 and perpendicular to the elongate axis of table. The saw blade 62 is conventionally positioned on that line and rail 46 adjusted until it is suitably engaged with the adjacent guard rail 72 of the saw. The other rail 44 is then adjusted until it is slideably engaged against the left plate edge 74.

The portion of the tapes 42 extending across cutout portion 22 are cut away. The blade 62 extends just below the level of top surface 16 into the cutout portion 22 to ensure the stud 18 is cut through completely. The chaff will fall freely between the ribs 20. The spacing between guide rails 44 and 46 corresponds to the distance between the opposing edges of the saw sole plate 72 and 74 and may for example be between 5½" and 9½" depending on the saw model. The saw 58 now rests on the rails 44 and 46 for sliding movement perpendicularly across the longitudinal axis of the stud 18. Power to the saw, of course, is usually provided over an electrical cable 76. The saw is now supported on the table for quick accurate cutting without being fixed to the table so that it is easily removable for other uses.

An adjustable stop 78, which is slidable along either of the fences 32 or 34 and which nests over the horizontal leg 38, may be set in a position corresponding to a desired length to be cut. A lever 80 serves to fix the stop in position by means of a pivoted cam which wedges against the fence so that successive pieces may be conveniently cut to identical length.

A piece of siding or board such as stud 18 is now inserted beneath the rails 44 and 46 from either end of the table and manually held firmly against the fences 32 and 34 and against surface 16. The stud 18 is arranged to extend beyond the blade 62 by a distance corresponding to the length to be cut as is measured conveniently against one of the tapes 42. The apron 24 which holds the posts 48 and 50 effectively widens the table to permit large widths of lumber to be received between the fences 42 and posts 48 and 50 without widening the table across its entire length.

The guide rails 44 and 46 are positioned above surface 16 at a sufficient height to bridge over 2" lumber which has a commonly accepted finish thickness of 1⅝". By use of spacers, this bridge height can be increased if desired. Increasing the height of the bridge also permits the saw blade to be raised thereby enabling the piece to be notched if desired.

The saw 58 is energized and moved along line 75. The opposed faces 45 and 47 of the vertical portion of rails 44 and 46 serve to guide the blade 62 along a single straight line so that an accurate, even cut is made. After the cut is made the saw is retracted and the stud moved forward to remove another length therefrom or a second stud is easily inserted in its place and cut. Thus, a large number of pieces may be conveniently and accurately cut to length. For certain applications, which are common at construction sites, an easily visible notch or other mark is placed adjacent an appropriate position of the scales and the stop 78 simply moved to the mark and clamped in position to permit successive pieces to be cut to the same length.

The foregoing constitutes a description of an improved table for use with a portable saw whose inventive concepts are believed set forth in the accompanying claims.

What we claim is:

1. A portable table for use with a portable saw and adapted to support said saw for the controlled cutting of construction material placed thereon, said table comprising an extruded metal member having a planar top section and a plurality of spaced apart reinforcing ribs depending from the underside of said top section and extending for at least a portion of the length thereof, track support means mounted on the upper surface of said metal member for operably receiving a portable saw for movement transverse to the axis of the table, said planar top section being adapted to be recessed across its width in the area of said track supporting means to provide a space for the reception of the saw blade during the cutting operation.

2. A portable table as defined in claim 1 wherein said track support means includes two parallel guide rails disposed transverse to the axis of the table and adapted to receive and support in slidable fashion the sole plate of a portable saw member, said table having means thereon for adjusting the spacing between said parallel rails for accommodating various types of portable saws.

3. The portable table as defined in claim 1 wherein the table is further provided with a plurality of guide pin members upstanding from the surface thereof, adapted to engage a section of construction material and to support said section at a predetermined angle relative to the path of travel of said saw.

4. A portable table as defined in claim 3 wherein said pin means are retractable and can be disposed below the working surface of the table when not in use.

5. The table as defined in claim 1 wherein said metal member is comprised of a first section and an extension, said extension being shorter in overall length than said first section and adjustable along the length of said first section, said extension increasing the effective width of said table without widening said table along its entire length.

6. The table as defined in claim 1 wherein said table is further provided with a vertical wall section along one edge thereof for abutting said construction material and maintaining said material in a fixed position with respect to said saw blade.

7. A portable table for use with a portable saw and adapted to support said saw for the controlled cutting of construction material placed thereon, said table comprising a planar top section having a recess intermediate the ends of said table, said recess extending in the direction of the width of said top section to form separated portion thereof, a plurality of spaced apart reinforcing ribs depending from the undersides of said top section and extending longitudinally for a portion of the length of said table to span the recess and effectively interconnect said separated portions of the top section, track support means mounted on the upper surface of said table for operably receiving a portable saw for movement transverse the length of the table, said track support means being positioned with respect to the recessed portion such that the blade of said saw is received in the space defined by the end faces of said separated portions and the longitudinally extending reinforcing ribs.

8. A portable table as defined in claim 7 wherein said track support means includes two parallel guide rails which are positioned transverse to the length of the table and are adjustable to receive and support in slidable fashion the sole plate of a portable saw, said table having thereon slot means for adjusting the spacing between said parallel guide rails.

9. A portable table as defined in claim 7 wherein said table is provided with a plurality of guide pin members upstanding from the surface thereof adapted to engage a section of construction material and support said material at a predetermined angle relative to the path of traverse of said saw member.

10. A portable table as defined in claim 9 wherein said pin members are retractable and can be disposed below the working surface of said table when not in use.

11. In combination with a portable table for supporting a section of construction material for engagement with cutting means, a plurality of pin members upstanding from the working surface of said table, said pins being positioned such that they are adapted to engage a section of construction material and support said section at a predetermined angle relative to the cutting means, and means associated with said table and said pin members permitting retraction of said pin members below the working surface of the table.

References Cited

UNITED STATES PATENTS

| | | |
|---|---|---|
| 2,682,899 | 7/1954 | Miller. |
| 2,739,624 | 3/1956 | Haddock _____ 143—132 X |
| 2,941,554 | 6/1960 | Long. |
| 3,130,758 | 4/1964 | McKinley _____ 143—132 X |
| 3,158,113 | 11/1964 | Johnson _____ 108—64 |
| 3,168,126 | 2/1965 | Konopka _____ 143—47 X |

WILLIAM W. DYER, JR., *Primary Examiner.*

W. D. BRAY, *Assistant Examiner.*